United States Patent
Kim

(10) Patent No.: US 11,573,529 B2
(45) Date of Patent: Feb. 7, 2023

(54) HOLOGRAPHIC OPTICAL SYSTEM STRUCTURE AND HOLOGRAPHIC DISPLAY APPARATUS USING SPATIAL LIGHT MODULATOR

(71) Applicant: ELECTRONICS AND TELECOMMUNICATIONS RESEARCH INSTITUTE, Daejeon (KR)

(72) Inventor: Hyun Eui Kim, Cheongju-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 103 days.

(21) Appl. No.: 17/117,853

(22) Filed: Dec. 10, 2020

(65) Prior Publication Data

US 2021/0181677 A1    Jun. 17, 2021

(30) Foreign Application Priority Data

Dec. 11, 2019 (KR) .......... 10-2019-0164491
Dec. 2, 2020 (KR) .......... 10-2020-0166889

(51) Int. Cl.
   *G03H 1/22*    (2006.01)
(52) U.S. Cl.
   CPC .......... *G03H 1/2205* (2013.01); *G03H 1/2294* (2013.01); *G03H 2223/23* (2013.01); *G03H 2223/55* (2013.01)

(58) Field of Classification Search
   CPC .... G03H 1/2294; G03H 2225/00; G03H 1/16; G03H 2001/045; G03H 1/2205;
   (Continued)

(56) References Cited

U.S. PATENT DOCUMENTS 9,535,401 B2    1/2017  Yamamoto et al.
2009/0295730 A1*  12/2009  Shin .............. G06F 3/0221
                                                                 455/566

(Continued)

FOREIGN PATENT DOCUMENTS

JP    2010-521004    6/2010
KR    10-2008-0012972    2/2008
(Continued)

OTHER PUBLICATIONS

Jinyoung Roh et al., "Full-color holographic projection display system featuring an achromatic Fourier filter", Optics Express, Jun. 26, 2017, vol. 25, No. 13.

*Primary Examiner* — Jade R Chwasz
(74) *Attorney, Agent, or Firm* — Kile Park Reed & Houtteman PLLC

(57) ABSTRACT

A holographic optical system and a holographic display method may be efficiently applied when using a spatial light modulator (SLM). A holographic display apparatus includes a spatial light modulator (SLM) configured to reproduce a hologram, and an optical system configured to perform Fourier transform with respect to the hologram of the SLM using a pair of first and second lenses, the first and second lenses being confocal. A Fourier plane which is a display reference image plane is positioned in the same plane space as the second lens.

10 Claims, 6 Drawing Sheets

(58) Field of Classification Search
CPC ........... G03H 2223/23; G03H 2223/55; G03H 2223/17; G03H 2001/221; G03H 2001/2236
See application file for complete search history.

(56) References Cited

U.S. PATENT DOCUMENTS

| | | |
|---|---|---|
| 2019/0187614 A1 | 6/2019 | Oh |
| 2019/0204783 A1* | 7/2019 | Kim .................... G03H 1/2205 |
| 2019/0204784 A1 | 7/2019 | Hong et al. |
| 2020/0401082 A1* | 12/2020 | Blodgett .............. G03H 1/2205 |

FOREIGN PATENT DOCUMENTS

| | | |
|---|---|---|
| KR | 10-2015-0011220 | 1/2015 |
| KR | 10-2017-0083865 | 7/2017 |

\* cited by examiner

FIG. 3

$$g_{L1}(x,y) = g_{in}(x,y)e^{-j\pi\frac{(x^2+y^2)}{\lambda f}}$$

$$g_{L2}(u,v) = \frac{e^{j2\pi\frac{f}{\lambda}}}{j\lambda f}\iint g_{L1}(x,y)e^{j\pi\frac{(u-x)^2+(v-y)^2}{\lambda f}}dxdy$$

$$g_{out}(u,v) = e^{-j\pi\frac{(u^2+v^2)}{\lambda f}}g_{L2}(u,v)$$

$$= e^{-j\pi\frac{(u^2+v^2)}{\lambda f}}\frac{e^{j2\pi\frac{f}{\lambda}}}{j\lambda f}\iint g_{in}(x,y)e^{-j\pi\frac{(x^2+y^2)}{\lambda f}}e^{j\pi\frac{(u-x)^2+(v-y)^2}{\lambda f}}dxdy$$

$$= \frac{e^{j2\pi\frac{f}{\lambda}}}{j\lambda f}\iint g_{in}(x,y)e^{-j2\pi\frac{(ux+vy)}{\lambda f}}dxdy$$

$$G(u,v) = \iint g_{in}(x,y)e^{-j2\pi(ux+vy)}dxdy = \mathcal{F}(g_{in}(x,y))\big|_{(u,v)}$$

$$g_{out}(u,v) = \frac{e^{j2\pi\frac{f}{\lambda}}}{j\lambda f}G(u',v')\big|_{u'=\frac{u}{\lambda f}, v'=\frac{v}{\lambda f}}$$

$$= \frac{e^{j2\pi\frac{f}{\lambda}}}{j\lambda f}G\left(\frac{u}{\lambda f},\frac{v}{\lambda f}\right)$$

HOLOGRAPHIC OPTICAL SYSTEM STRUCTURE AND HOLOGRAPHIC DISPLAY APPARATUS USING SPATIAL LIGHT MODULATOR

CROSS REFERENCE TO RELATED APPLICATION

The present application claims priority to Korean Patent Application Nos. 10-2019-0164491 filed Dec. 11, 2019 and 10-2020-0166889 filed Dec. 2, 2020, the entire contents of which is incorporated herein for all purposes by this reference.

BACKGROUND OF THE INVENTION

1. Field of the Invention

The present disclosure relates to a holographic optical system structure and a holographic display apparatus, and more particularly, to a holographic optical system and a holographic display apparatus that can be efficiently applied when using a spatial light modulator (SLM).

2. Description of the Related Art

Hologram is a combination of the Greek "HOLOGS" meaning whole and the Greek "GRAM" meaning message. In addition, the hologram is made using the holographic principle and means a fringe pattern which reproduces a three-dimensional image or a medium having such a fringe pattern recorded thereon.

The holographic principle is to split coherent light, e.g., a beam from a laser, into two lights by a beam splitter, one light directly illuminates a recording medium and the other light illuminates an object to be viewed. In this case, light directly illuminating the recording medium is referred to as reference light and light illuminating the object is referred to as object light. Since the object light is reflected from each surface of the object, a phase difference (e.g., distance from the surface of the object to the recording medium) may vary according to the surface of the object. At this time, unmodified reference light interfere with the object light, and a hologram recording apparatus records a fringe pattern of the object light and the reference light on a recoding medium such as a photoplate or a camera (CCD or CMOS). In addition, a hologram reproduction apparatus may reproduce a hologram by re-irradiating light onto a recording medium having the fringe pattern recorded thereon, and, at this time, the reference light having the same wavelength and phase as upon recording is irradiated.

A spatial light modulator (SLM) is a major component of a holographic display which enables dynamic modulation of the phase or amplitude of incident light. Conventionally, various types of SLMs have been proposed. In particular, recently, an electrically addressable spatial light modulator (EASLM) based on liquid crystal (LC) technology has been used as a high-resolution device having $2\pi$ phase modulation.

Since a general spatial light modulator (SLM) has a two-dimensional periodic pixel structure, it is possible to analyze the viewing angle of a display through a grating spacing and a relationship between the angles of incident beam and diffracted beam. For example, it is possible to analyze the viewing angle of a holographic display through a diffraction grating theory as shown in Equation 1 below.

Equation 1

$$d^*\sin\theta = m\lambda \qquad \text{Grating equation:}$$

where, $\theta$ denotes a diffraction angle, d denotes a spacing between the slits or a grating period or pixel period, m denotes the order of diffraction (m=0, ±1, ±2, ...), and $\lambda$ denotes a wavelength.

FIG. 1 is a view illustrating a holographic display method using a general spatial light modulator (SLM). Since the viewing angle of the holographic display is determined by the diffraction angle $\theta$ according to the pixel period of the SLM 100, research into the SLM 100 for reducing a pixel pitch 101 has been conducted.

The viewing angle of the holographic display is limited to a maximum diffraction angle in a single order (diffraction order) in Equation 1 above. This is because, when SLM pixels are arranged in a period having a certain spacing d, orders of diffraction are repeatedly generated in a specific angle direction for every integer multiple of a wavelength. Here, since a reconstructed holographic image is repeated in each order to deliver incorrect spatial information, a user perceives this as noise. Accordingly, various researches into the SLM has been conducted in order to implement a holographic display capable of providing a reasonable viewing angle to a user and expressing a hologram with a high spatial frequency.

In addition, for a digital holographic display structure, it is necessary to remove optical spatial noise according to the principle of holographic technology. Generally, the optical spatial noise is generated by a conjugate wave, high-order diffracted light and non-diffracted light. In addition, a 4-f relay optical system is applicable to a general holographic display structure. However, in such a 4-f optical system, as the area of the SLM increases and diffraction performance is improved, a lens having a larger diameter and high lens power is required to converge the diffracted light. Accordingly, for a holographic display structure, with development of an SLM element, a holographic display optical system suitable therefor is required.

Hereinafter, in the present disclosure, the term "optical system" may also be referred to as an "optical system structure" and should be interpreted as having substantially the same meaning.

SUMMARY OF THE INVENTION

The present disclosure is to provide a holographic display optical system structure and a holographic display method using the same.

The present disclosure is to provide an optical system structure corresponding to a high-performance spatial light modulator, and a holographic display apparatus using the same.

The present disclosure is to provide an optical system structure which does not require an additional optical element for noise filtering, and a holographic display apparatus using the same.

The present disclosure is to provide an optical system structure capable of shortening an optical path, and a holographic display apparatus using the same.

The present disclosure is to provide an optical system structure capable of reducing required optical system performance and a holographic display apparatus using the same.

The present disclosure is to provide an optical system structure capable of improving a display form factor, and a holographic display apparatus using the same.

The present disclosure is to provide an optical system structure capable of reducing manufacturing cost, and a holographic display apparatus using the same.

The present disclosure is to provide an optical system structure capable of providing a large display area and a wide diffraction angle, and a holographic display apparatus using the same.

The present disclosure is to provide an optical system structure which does not require a projection lens for magnified projection and has a viewing zone formed at a short distance, and a holographic display apparatus using the same.

The technical problems solved by the present disclosure are not limited to the above technical problems and other technical problems which are not described herein will become apparent to those skilled in the art from the following description.

The present disclosure can efficiently provide a holographic display apparatus through a holographic optical system structure based on Fourier transform using a pair of lens.

According to an aspect of the present disclosure, a holographic display apparatus includes a spatial light modulator (SLM) configured to reproduce a hologram, and a Fourier optical system configured to perform Fourier transform with respect to the hologram of the SLM using a pair of first and second lenses. Here, the optical system is configured such that a Fourier plane which is a display reference image plane is positioned in the same plane space as the second lens.

In addition, according to another aspect of the present disclosure, a holographic display apparatus includes a spatial light modulator (SLM) configured to reproduce a hologram and a Fourier optical system including a pair of first and second lenses to perform Fourier transform with respect to the hologram of the SLM. Here, a position of a user viewing zone may be set to a position d adjacent to a display Fourier plane by adjusting a focal length of the second lens corresponding to the first lens. In addition, the second lens includes a diffractive optical element, in order to configure a large-area display structure.

In addition, according to another aspect of the present disclosure, an optical system in a holographic display apparatus including a pair of first and second lenses configured to perform Fourier transform. Here, the first lens and the second lens are disposed such that a Fourier plane which is an image plane of a display by the optical system is positioned in the same plane space as the second lens.

Features briefly summarized above with respect to the present disclosure are only exemplary aspects of the detailed description of the present disclosure described below, and do not limit the scope of the present disclosure.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a view showing a mathematical relationship between input and output signals applied to the optical system structure of FIG. 2;

DESCRIPTION OF THE PREFERRED EMBODIMENTS

Figure 1:
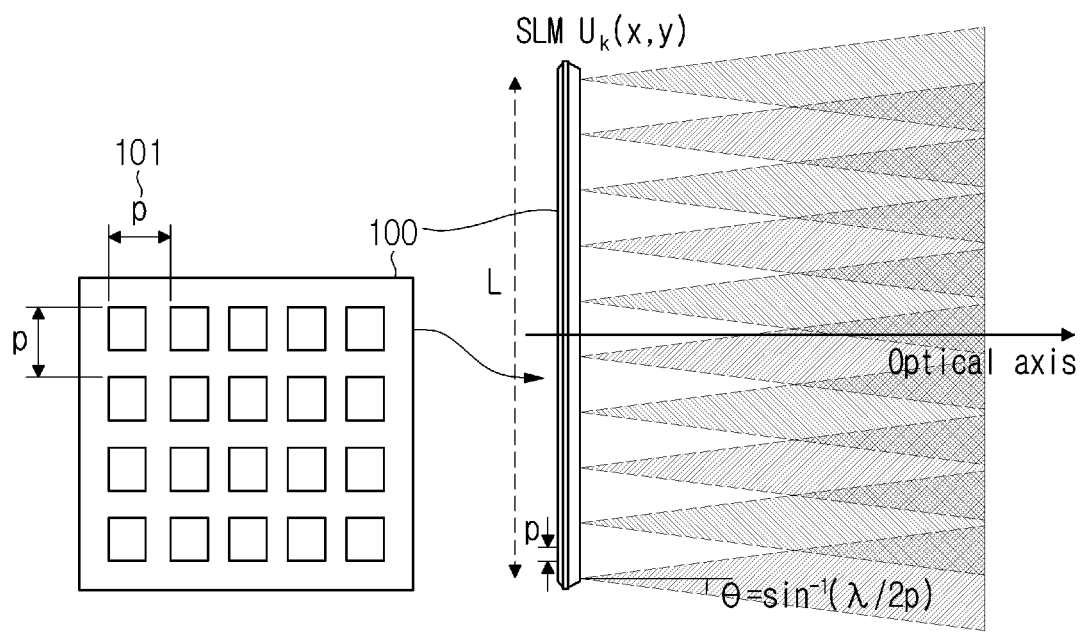
FIG. 1 is a view illustrating a holographic display method using a general spatial light modulator (SLM)

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. In addition, parts not related to the description of the present disclosure in the drawings are omitted, and similar reference numerals are attached to similar parts.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

Hereinafter, the embodiments of the present disclosure will be described with reference to the accompanying drawings.

The present disclosure relates to a holographic display optical system and a holographic display method using the same. The optical system of the present disclosure is functionally based on a Fourier holographic display structure.

Figure 2:
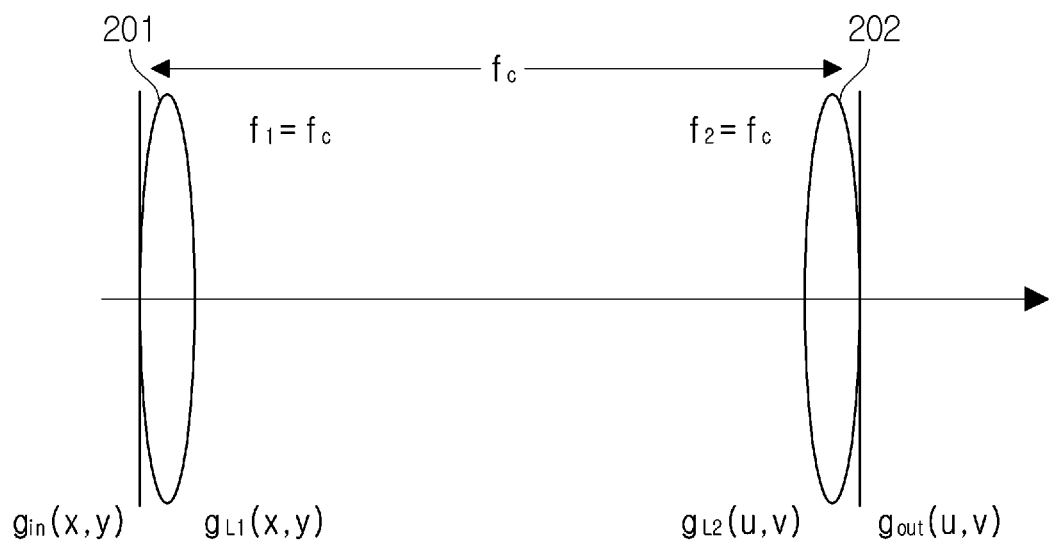
FIG. 2 is a view illustrating an optical system structure applied to a holographic display apparatus according to an embodiment of the present disclosure.

FIG. 2 is a view illustrating an optical system structure applied to a holographic display apparatus according to an embodiment of the present disclosure, and FIG. 3 is a view showing an optical relationship between input and output signals applied to the optical system structure of FIG. 2.

The optical system structure of the present disclosure is based on a Fourier holographic display structure. Here, the optical Fourier transform applied to the present disclosure is characterized in that it has an optical structure for performing Fourier transform using a pair of lenses rather than a conventional Fourier transform based holographic display structure using a single lens.

FIG. 2 shows a structure in which Fourier transform is performed using a pair of lenses 201 and 202 according to an embodiment of the present disclosure. The focal length $f_1$ of the first lens 201 and the focal length $f_2$ of the second lens 202 are the same and are confocal ($f_c$). FIG. 3 shows the optical relationship between the two confocal lenses 201 and 202 by equation. From the equation of FIG. 3, it can be seen that an input field $g_{in}(x,y)$ of the first lens 201 and an output field $g_{out}(u,v)$ of the second lens 202 have an optical Fourier transform relationship. Hereinafter, in the present disclosure, the two confocal lenses may be referred to as a first lens 201 and a second lens 202 or a first Fourier lens 201 and a second Fourier lens 202.

Figure 4:
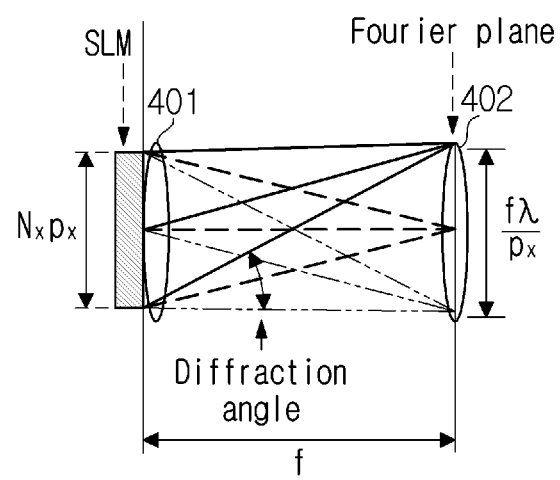
FIG. 4 is a view illustrating a holographic display apparatus including an optical system structure of a holographic display according to an embodiment of the present disclosure.

FIG. 4 is a view illustrating a holographic display apparatus including an optical system structure of a holographic display according to an embodiment of the present disclosure.

Referring to FIG. 4, the holographic display apparatus according to the present disclosure includes a spatial light modulator (SLM) having the hologram and an optical system including a first Fourier lens 401 and a second Fourier lens 402 to perform Fourier-transform with respect to the SLM using the pair of lenses. Here, the optical Fourier plane by the first Fourier lens 401 and the second Fourier lens 402 is positioned in the same plane space as the second Fourier lens.

The first Fourier lens 401 may be positioned in close contact with the SLM, and the second Fourier lens may be positioned at a point spaced apart by the focal length f of the first Fourier lens. For example, FIG. 4 shows the case where the first Fourier lens 401 is positioned after the SLM on the optical path.

On the other hand, the first Fourier lens 401 may be positioned before the SLM on the optical path. At this time, if the first Fourier lens 401 is positioned before the SLM on the optical path, the focal length $f_1$ of the first Fourier lens 401 may be set to $f_1=f_2+d_1$. Here, $d_1$ means a distance between the first Fourier lens 401 and the SLM, and $f_2$ means a focal length between the SLM and the second Fourier lens 402.

Figure 5:
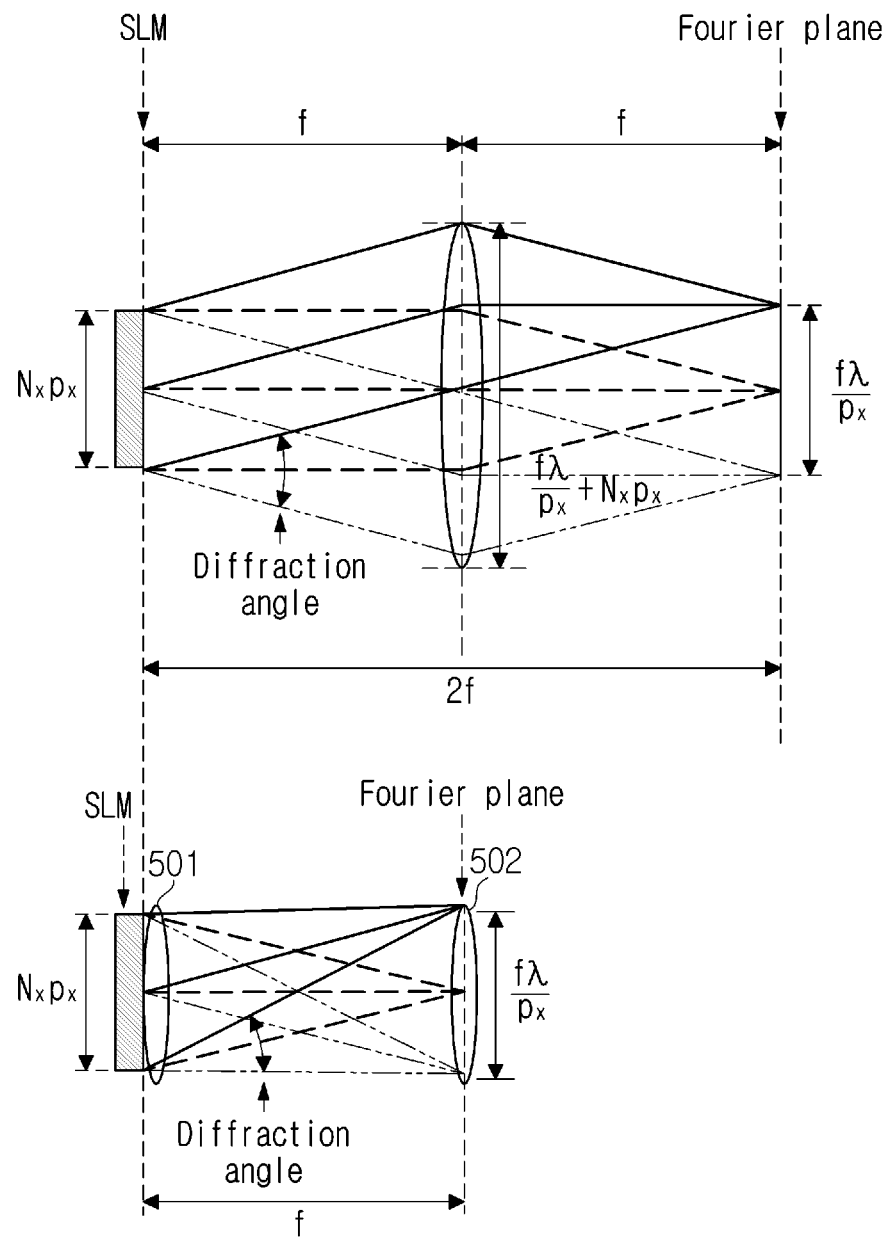
FIG. 5 is a view illustrating comparison between the optical system structure of a holographic display according to an embodiment of the present disclosure and a conventional optical system structure.

FIG. 5 is a view illustrating comparison between the optical system structure of a holographic display according to an embodiment of the present disclosure and a conventional optical system structure.

Referring to FIG. 5, the upper side of FIG. 5 shows a structure using a conventional single Fourier lens using an SLM. On the other hand, the lower side of FIG. 5 shows a holographic display optical system structure, to which a confocal optical Fourier transform structure according to the present disclosure is applied using the SLM having the same performance.

In FIG. 5, $N_x$ denotes the number of pixels of the SLM, f denotes the focal length of the lens, and $\lambda$ denotes a wavelength. In addition, in each optical system structure, the hologram is reconstructed on the Fourier plane and, at this time, a maximum reproduction image reproduced on the Fourier plane has the same size of $f*\lambda/p_x$.

The optical system structure of an example of the present disclosure shown at the lower side of FIG. 5 has the following advantages compared to the conventional optical Fourier transform method using the single lens.

First, the optical system structure of the present disclosure can perform the same optical function in half the optical path compared to the conventional optical system structure. Accordingly, when the holographic display apparatus is configured using the optical system structure of the present disclosure, the optical path may be shortened in half, thereby improving the display form factor.

As another advantage, the Fourier lens performance required for the optical system structure may be lower than the Fourier lens performance required for the conventional optical system structure. That is, when holographic image reproduction having the same size is assumed, the required focal length of the Fourier lens is the same for the conventional structure and the proposed structure. On the other hand, the required size of the aperture of the lens is determined by only the diffraction angle according to the pixel period in the proposed structure of the present disclosure shown at the lower side of FIG. 5, whereas the entire area of the SLM is additionally considered and a lens with lower F/# is required in the conventional structure shown at the upper side of FIG. 5.

In addition, an optical noise removal method of an optical system structure according to the present disclosure shown at the lower side of FIG. 5 may be configured more simply than the conventional one. For example, in the conventional holographic display structure, optical noise is removed by applying a spatial filter to a Fourier plane in a 4-f relay optical system. Accordingly, the conventional optical system structure requires arrangement of a separate spatial filter element. On the other hand, in the optical system structure according to the present disclosure shown at the lower side of FIG. 5, since the Fourier plane coincides with the position of the second lens configuring the optical system, the position may be moved to a space between order noises through phase shift of a hologram signal. Accordingly, by disposing the aperture of the second lens between order noises, it is possible to remove optical noise without a separate optical element.

Figure 6:
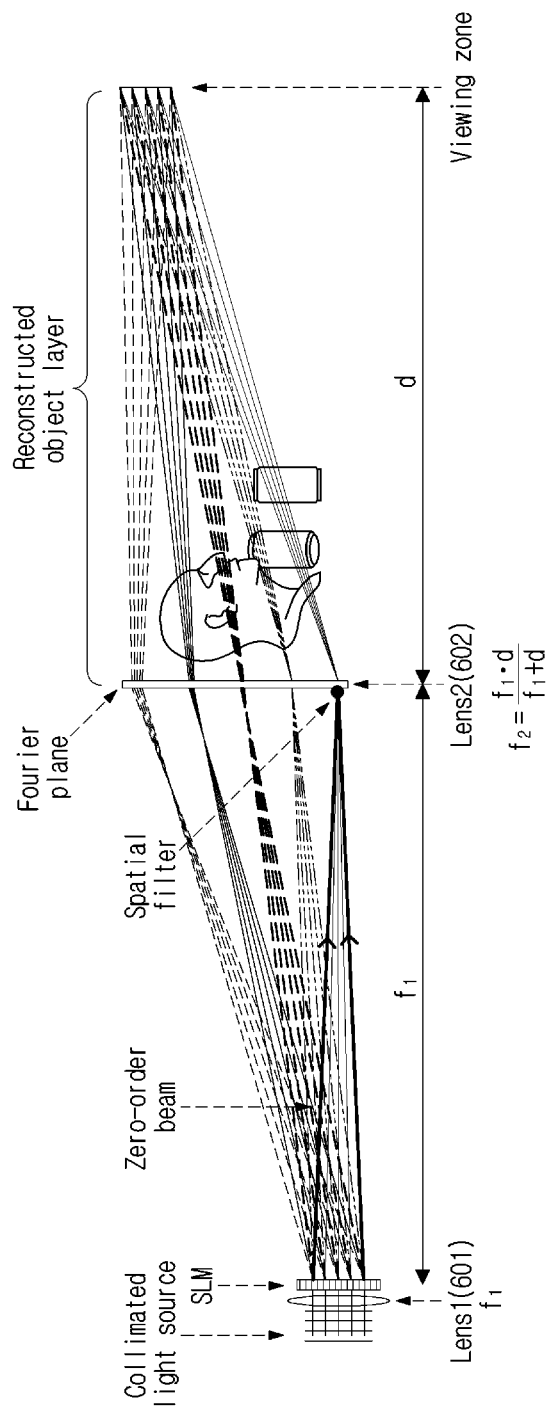
FIG. 6 is a view illustrating a holographic display optical system structure and a holographic display apparatus suitable for a viewing zone formed at a short distance according to another embodiment of the present disclosure.

FIG. 6 is a view illustrating a holographic display optical system structure and a holographic display apparatus suitable for a viewing zone formed at a short distance according to another embodiment of the present disclosure.

According to the holographic display apparatus of the present disclosure, the position of a user viewing zone may be set to a distance adjacent to a display. That is, by adjusting the focal length of a second Fourier lens 602 corresponding to a first Fourier lens 601, the position of the user viewing zone may be set to an adjacent distance d from the displayed Fourier plane.

For example, in configuring the optical system configuring the holographic display apparatus of FIG. 6, when the focal length of the first Fourier lens 601 is $f_1$, the focal length of the second Fourier lens may be set to $$f_2 = \frac{f_1 \cdot d}{f_1 + d}.$$

Here, in configuring the Fourier holographic display optical system of the present disclosure, the size of the second Fourier lens 602 is equal to that of an image to be reproduced. Accordingly, when the hologram image is expanded and reproduced, it is more effective to configure the second Fourier lens 602 using a diffractive optical element (DOE) capable of easily manufacturing a large-area element.

In addition, in FIG. 6, on the Fourier plane formed in the same plane space as the position of the second Fourier lens 602, the aperture of the second Fourier lens may be disposed between order noises and the hologram signal may be moved to a space between the order noises through phase shift, thereby removing optical spatial noise. That is, by a zero-order beam of the first Fourier lens 601, it is possible to remove optical noise without a separate optical element through only a focus formed on one side of the second Fourier lens 602. Accordingly, the spatial filter shown in FIG. 6 for the sake of explanation does not mean the separate optical filter element but means the focus formed on one side of the second Fourier lens 602.

According to the present disclosure, since an optical path in a holographic display apparatus is shortened and required optical system performance is lowered, it is possible to improve a display form factor.

In addition, according to the present disclosure, it is possible to remove optical noise through a Fourier holographic optical system structure using a pair of lenses.

In addition, it is possible to provide a holographic display apparatus which does not require an additional optical structure for magnified projection of a hologram through the Fourier holographic optical system structure using the pair of lenses.

In addition, according to the present disclosure, it is possible to reduce manufacturing cost of the holographic display apparatus.

In addition, according to the present disclosure, it is possible to provide a holographic display apparatus capable of forming a viewing zone at a shorter distance.

The effects of the present disclosure are not limited to the above-described effects and other effects which are not described herein may be derived by those skilled in the art from the description of the embodiments of the present disclosure.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, and a non-transitory computer-readable medium having such software or commands stored thereon and executable on the apparatus or the computer.

What is claimed is:

1. A holographic display apparatus comprising:
   a spatial light modulator (SLM) configured to reproduce a hologram; and
   an optical system configured to perform Fourier transform with respect to the hologram of the SLM using a pair of first and second lenses, the first and second lenses being confocal,
   wherein a Fourier plane which is a display reference image plane is positioned in the same plane space as the second lens.

2. The holographic display apparatus of claim 1, wherein the first lens is positioned in close contact with the SLM, and
   wherein the second lens is spaced apart from the first lens by a focal length f of the first lens.

3. The holographic display apparatus of claim 2, wherein the first lens is closely positioned after the SLM on an optical path.

4. The holographic display apparatus of claim 2, wherein the first lens is positioned before the SLM on an optical path.

5. The holographic display apparatus of claim 1, wherein an aperture of the second lens is disposed between order noises on the Fourier plane formed in the same plane space as the second lens, and optical space noise is removed by moving a hologram signal to a space between the order noises through phase shift.

6. The holographic display apparatus of claim 5, wherein the second lens includes a diffractive optical element, in order to configure a large-area display structure.

7. A holographic display apparatus comprising:
   a spatial light modulator (SLM) configured to reproduce a hologram; and
   an optical system including a pair of first and second lenses to perform Fourier transform with respect to the hologram of the SLM,
   wherein a position of a user viewing zone is set to a position d adjacent to a display Fourier plane by adjusting a focal length of the second lens corresponding to the first lens.

8. The holographic display apparatus of claim 7, wherein the focal length of the second lens ($f_2$) is set to $$f_2 = \frac{f_1 \cdot d}{f_1 + d},$$

wherein $f_1$ is a focal length of the first lens, d is a distance from the display Fourier plane to the position of the user viewing zone.

9. The holographic display apparatus of claim 7, wherein an aperture of the second lens is disposed between order noises on the Fourier plane formed in the same plane space as the second lens, and optical space noise is removed by moving a hologram signal to a space between the order noises through phase shift.

10. An optical system in a holographic display apparatus, comprising:
    a pair of first and second lenses configured to perform Fourier transform,
    wherein the first lens and the second lens are disposed such that a display Fourier plane by the optical system is positioned in the same plane space as the second lens.

* * * * *